2,698,839

Patented Jan. 4, 1955

2,698,839

COPOLYMERIZATION OF STYRENE AND DRYING OILS

Stanley Erwin Bradshaw, Tunbridge Wells, and Edward Michael Evans, Tonbridge, England, assignors to British Resin Products Limited, London, England, a British company No Drawing. Application June 26, 1950, Serial No. 170,458

Claims priority, application Great Britain July 6, 1949

19 Claims. (Cl. 260—23)

The present invention relates to the copolymerisation of styrene compounds, by which is meant styrene, alpha-methyl styrene and their polymerisable nuclear chlorine, methyl and ethyl substitution derivatives, with triglycerides of long chain fatty acids at least some of which have conjugated double bonds in the molecule, such as blown linseed oil, dehydrated castor oil and tung oil, hereinafter termed "drying oils," and has as one object the provision of a process whereby the tendency to gel during the copolymerisation is reduced and products of improved compatability with oils may be obtained.

The processes hitherto known for the production of such copolymers suffer from various disadvantages. For example, if the oil is only slightly conjugated the styrene chains in the resulting resin tend to be of such a length that compatability is impaired and a clear film cannot be obtained, this behaviour severely limiting the amount of styrene which can be polymerised. On the other hand, those oils which possess a high degree of conjugation, although remaining substantially clear and homogeneous when copolymerised with styrene, suffer from the disadvantage that, if substantial quantities of styrene are incorporated, the resulting polymer solution or varnish has too great a viscosity and has a strong tendency to gel during or after manufacture.

Various modifications have been proposed in the past whereby some of these disadvantages can be mitigated, among which may be mentioned the gradual addition of the styrene component to the oil, the gradual addition of the catalyst and the incorporation of small proportions of polymerisation inhibitors. However, these methods, and particularly the last-named, although increasing the amount of styrene which may be copolymerised without gelling or, in some cases, without causing incompatability, have the disadvantage that they increase the amount of process control required and result in a diminution of the speed of the reaction.

According to the present invention, styrene compounds and drying oils are copolymerised in the presence of a transfer agent with or without a polymerisation catalyst and/or solvent, the term "transfer agent" herein signifying a chlorine-substituted paraffin or olefin of 1–3 carbon atoms. Suitable agents include carbon-tetrachloride, ethylene dichloride and tetrabromethylene.

It is believed that the transfer agents interrupt the growing styrene chain and initiate a fresh chain by the free radical produced. In this way, they compete with the drying oil and obviate the building up of an excessive degree of cross-linking and, at the same time, shorten the chain length of the styrene fraction of the resulting varnish, thereby improving its compatibility characteristics. Thus, the relative amount of any transfer agent which is to be used in a particular case may be estimated roughly by a comparison between its transfer coefficient, determined in a known way by polymerisation of styrene alone and in the presence of the transfer agent followed by a comparison of the molecular weights of the products so produced, and the corresponding figure for any other transfer agent such as carbon tetrachloride taken as standard, this ratio, multiplied by the molar concentration of the standard employed, giving an approximate figure for the amount of transfer agent required for similar results at any particular temperature. Naturally, the amount of the agent employed may be greater or less than this, according to the desired molecular weight of the product, a greater amount resulting in a resin of lower molecular weight, but this calculation is of assistance in arranging the few test runs which normally precede large scale manufacture, in view of the very wide variation in transfer coefficient among the various individual transfer agents. For example, the transfer coefficient at 60° C. of diphenyl methane is $23 \times 10^{-5}$, of tri-phenyl methane $35 \times 10^{-5}$, of fluorene $750 \times 10^{-5}$, and of pentaphenyl ethane $200,000 \times 10^{-5}$, while the transfer coefficient of carbon tetrachloride is $900 \times 10^{-5}$ at 60° and $3250 \times 10^{-5}$ at 130° C.

Advantageously, the transfer agent is, according to the invention, present in an amount in the range of about 1.6–25% by weight of the styrene compound.

The following examples illustrate the use of carbon tetrachloride according to this invention in the copolymerisation of styrene with tung oil, the parts being by weight.

Example 1

A mixture of 95 parts of styrene and 5 parts of raw tung oil was divided into 5 equal parts, 4 of which were mixed with varying amounts of carbon tetrachloride, and all 5 parts were heated at 138.5° C. The amounts of transfer agent employed and the results of the polymerisation are given in the following table:

| Percent carbon tetrachloride on styrene | Gelling time (hours) | Percent solids in gel | Percent styrene reacted | Reacted styrene—tung oil in copolymer |
|---|---|---|---|---|
| 0.0 | 1.55 | 26.5 | 23 | 4.3 |
| 1.6 | 1.75 | 39.3 | 26 | 5.0 |
| 4.7 | 2.60 | 33.4 | 32 | 6.0 |
| 7.9 | 3.32 | 40.2 | 40 | 7.6 |
| 11.1 | 5.56 | 52.7 | 56 | 10.7 |

Thus, the incorporation of increasing amounts of the chain transfer agent results in a diminishing tendency to gel and in the formation of a considerably greater quantity of solids before gelling takes place; a comparison of columns 2 and 3 shows that the transfer agent does not retard the copolymerisation to any significant extent. Naturally, the reaction may be interrupted at any time prior to the gelling as in the usual commercial practice, whereby a varnish may be obtained possessing any desired viscosity by the removal of excess styrene and the addition of solvent. Furthermore, the small residual content of chain transfer agent when using agents of a high boiling point will minimise the occurrence of gelling at room temperature due to any residual monomeric styrene while the varnish produced is being stored.

Example 2

A mixture of 4 parts of styrene, 1 part of tung oil which had been bodied by heating for 40 minutes at 230° C. and 1 part of carbon tetrachloride was refluxed gently for 7 hours when the solid content was 33%. The mixture was then distilled under vacuum to remove unreacted styrene and carbon tetrachloride and 2 parts of xylene were added to the residue to give a varnish solution having a viscosity of 1.6 poises and 50% by weight solids content. On the addition of 0.05% of cobalt and 0.5% of lead as naphthenate, by weight on the solids, this varnish gave a clear brilliant film of excellent gloss which felt dry to the touch in less than 1 hour and progressively hardened overnight.

The styrene compounds which may be used according to this invention include styrene, alpha-methyl styrene, paramethyl styrene, alphamethyl paramethyl styrene, metaethyl styrene, parachlor styrene and vinyl metaxylene, but the process finds particular application in the copolymerisation of drying oils with those styrene compounds having an unsubstituted vinyl group, since the difficulties described above are much less pronounced in the case of alphamethyl styrene compounds. The proportions of the styrene compound to drying oil may be those in common use, and a range of 5–97% by weight of the styrene compound, based on the mixture, is suitable.

In the production of varnishes from the ungelled copolymers of this invention, it is preferred that any residual unpolymerised styrene should be removed before the usual additives, namely inert solvents and metallic driers, are added. Suitable driers for this purpose are the well known oil-soluble salts of metals such as manganese, iron, lead and cobalt with long chain fatty acids or naphthenic acids.

We claim:

1. A process which comprises copolymerising, by the action of heat, a styrene compound selected from the group consisting of styrene, alphamethyl styrene and their polymerisable nuclear chlorine, methyl and ethyl substitution derivatives with a vegetable drying oil in the presence of a transfer agent selected from the group consisting of carbon tetrachloride, ethylene dichloride and tetra-bromethylene.
2. A process as set forth in claim 1, wherein said styrene compound has an unsubstituted vinyl group.
3. A process as set forth in claim 1, wherein said transfer agent is present in an amount in the range of about 1.6–25% by weight of the styrene compound.
4. A process as set forth in claim 1, wherein the styrene compound amounts to 5–97% by weight of its mixture with the drying oil.
5. A process which comprises copolymerising, by the action of heat, a styrene compound selected from the group consisting of styrene, alphamethyl styrene and their polymerisable nuclear chlorine, methyl and ethyl substitution derivatives with a vegetable drying oil in the presence of a transfer agent selected from the group consisting of carbon tetrachloride, ethylene dichloride and tetra-bromethylene, and interrupting the copolymerisation prior to gelation.
6. A process as set forth in claim 5, wherein said styrene compound has an unsubstituted vinyl group.
7. A process as set forth in claim 5, wherein said transfer agent is present in an amount in the range of about 1.6–25% by weight of the styrene compound.
8. A process as set forth in claim 5, wherein the styrene compound amounts to 5–97% by weight of its mixture with the drying oil.
9. A process which comprises copolymerising styrene with about 5% by weight of tung oil in the presence of about 1.6–25%, based on the styrene, of carbon tetrachloride.
10. A process which comprises copolymerising 4 parts by weight of styrene with about 1 part of tung oil in the presence of about 1 part of carbon tetra-chloride.
11. A process as set forth in claim 1, wherein said styrene compound is styrene, and said transfer agent is carbon tetrachloride.
12. A process as set forth in claim 1, wherein said styrene compound is vinyl metaxylene and said transfer agent is carbon tetrachloride.
13. A copolymer when produced as set forth in claim 1.
14. A copolymer when produced as set forth in claim 5.
15. A varnish comprising a copolymer of claim 14, an inert solvent and a metallic drier.
16. A varnish as set forth in claim 15, substantially free from unpolymerised styrene compound.
17. A varnish comprising an ungelled copolymer of claim 9, an inert solvent and metallic drier.
18. A varnish comprising an ungelled copolymer of claim 10, an inert solvent and a metallic drier.
19. A varnish obtained by copolymerising 4 parts by weight of styrene with about 1 part of tung oil in the presence of about 1 part of carbon tetrachloride, interrupting the polymerisation prior to gelation, distilling off unreacted styrene, and adding 2 parts of xylene, 0.5% of cobalt and naphthenate and 0.5% of lead as naphthenate.

References Cited in the file of this patent

UNITED STATES PATENTS

| | | |
|---|---|---|
| 2,505,844 | Tawney | May 2, 1950 |
| 2,550,114 | Foster | Apr. 24, 1951 |
| 2,551,352 | Tawney | May 1, 1951 |

OTHER REFERENCES

Ritchie: A Chemistry of Plastics and High Polymers (Interscience Pub.), 1949, pp. 33 and 34.